(12) United States Patent
Meng

(10) Patent No.: US 8,581,860 B2
(45) Date of Patent: Nov. 12, 2013

(54) TOUCH PANEL WITH PDLC FILM AND TOUCH-SENSITIVE DISPLAY DEVICE USING SAME

(75) Inventor: Kai Meng, Shenzhen (CN)

(73) Assignees: Innocom Technology (Shenzhen) Co., Ltd., Shenzhen (CN); Chimei Innolux Corporation, Miaoli County (TW)

( * ) Notice: Subject to any disclaimer, the term of this patent is extended or adjusted under 35 U.S.C. 154(b) by 931 days.

(21) Appl. No.: 12/713,307

(22) Filed: Feb. 26, 2010

(65) Prior Publication Data
US 2011/0109566 A1  May 12, 2011

(30) Foreign Application Priority Data

Nov. 12, 2009 (CN) .......................... 2009 1 0309613

(51) Int. Cl.
*G09G 3/36* (2006.01)
(52) U.S. Cl.
USPC ............. 345/173; 345/104; 345/87; 345/174; 349/86; 349/89; 178/18.06
(58) Field of Classification Search
USPC ..................... 345/87, 90, 104, 107, 173, 174; 349/61–63, 86–89; 178/18.01, 18.03, 178/18.06
See application file for complete search history.

(56) References Cited

U.S. PATENT DOCUMENTS

| 4,814,760 | A | * | 3/1989 | Johnston et al. ............... 345/104 |
| 5,056,898 | A | * | 10/1991 | Ma et al. ......................... 349/94 |
| 5,610,629 | A | * | 3/1997 | Baur .............................. 345/104 |
| 6,177,918 | B1 | | 1/2001 | Colgan et al. |
| 2002/0130989 | A1 | * | 9/2002 | Nakao et al. .................... 349/86 |
| 2004/0155991 | A1 | * | 8/2004 | Lowles et al. ................... 349/12 |

OTHER PUBLICATIONS http://web.archive.org/web/20000902165856/http://plc.cwru.edu/tutorial/enhanced/files/pdlc/droplet/droplet.htm (published Sep. 2, 2000).*

* cited by examiner

*Primary Examiner* — Lun-Yi Lao
*Assistant Examiner* — Priyank Shah
(74) *Attorney, Agent, or Firm* — WPAT, PC; Justin King

(57) ABSTRACT

A touch panel and a touch-sensitive display device capable of providing three-dimensional contact detection are provided. The touch panel includes a first conductive layer, a second conductive layer, and an insulating layer between the first and second conductive layers. The insulating layer includes a polymer dispersed liquid crystal (PDLC) film.

10 Claims, 8 Drawing Sheets

US 8,581,860 B2

TOUCH PANEL WITH PDLC FILM AND TOUCH-SENSITIVE DISPLAY DEVICE USING SAME

BACKGROUND

1. Technical Field

The present invention relates to sensing technology, and more particularly, to a touch panel with a polymer dispersed liquid crystal (PDLC) film and a touch-sensitive display device using the touch panel.

2. Description of Related Art

With developments in flat panel display (FPD) and sensing technologies, touch-sensitive display devices are used widely in electronic devices such as notebooks, personal digital assistants (PDAs), video cameras, and the like.

A frequently used touch-sensitive display device generally employs a so-called two-dimensional (2D) sensing technology. The touch-sensitive display device includes a touch panel driven by an external driving circuit. In operation, when contacted by a user's fingertip or stylus, the touch panel provides a corresponding contact signal to the driving circuit, such that the driving circuit can detect planar coordinates (i.e., 2D coordinates) consisting of an X-axis coordinate and a Y-axis coordinate of the contact point. Based on the 2D coordinates, the touch-sensitive display device can automatically identify a corresponding operation command, and respond accordingly with a designated display or operation.

Despite its convenience, it should be noted that the functionality of such a touch-sensitive display device is limited because it is restricted to planar (2D) display technology. With the development of three-dimensional (3D) display technology, the importance of the above-described frequently used touch-sensitive display device is predicted to wane.

What is needed, therefore, is a touch panel and a touch-sensitive display device, which can overcome the limitations of the above-described frequently used touch-sensitive display device.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views, and all the views are schematic.

DETAILED DESCRIPTION

Reference will now be made to the drawings to describe certain exemplary embodiments of the present disclosure in detail.

Figure 1:
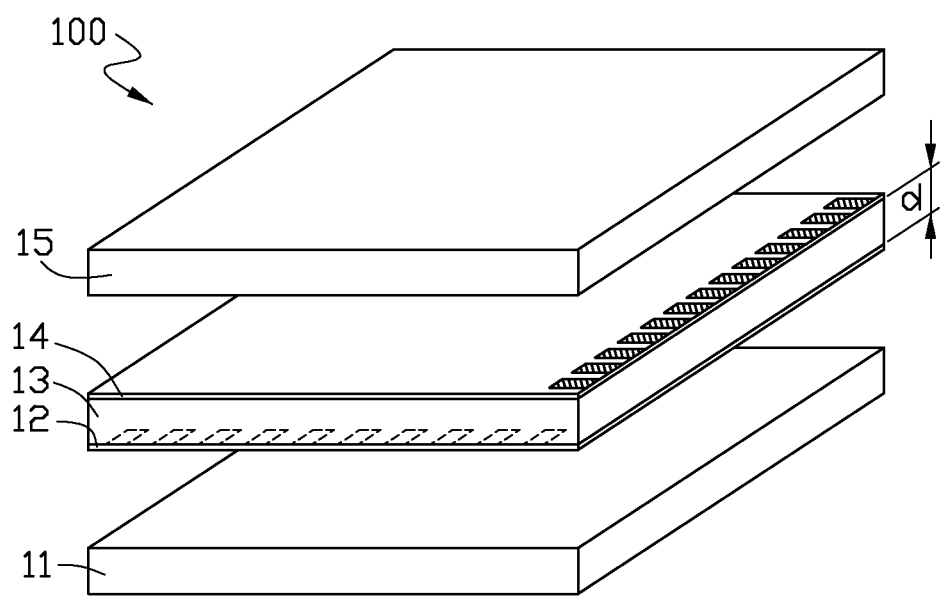
FIG. 1 is an exploded view of an exemplary embodiment of a touch panel according to the present disclosure, the touch panel including a first conductive layer, an insulating layer, and a second conductive layer.

FIG. 1 is an exploded view of an exemplary embodiment of a touch panel 100 according to the present disclosure. The touch panel 100 includes a first substrate 11, a first conductive layer 12, an insulating layer 13, a second conductive layer 14, and a second substrate 15 placed in that order from bottom to top. An upper surface of the second substrate 15 may serve as a contact surface of the touch panel 100. A contact action provided by, e.g., a user's fingertip or stylus can be applied onto the contact surface of the touch panel 100, whereupon the touch panel 100 is capable of outputting contact-sensing signals indicating three-dimensional (3D) coordinates of the contact point.

The first substrate 11 and the second substrate 15 can both be insulating substrates. In particular, the second substrate 15 may be made of elastic material, which is deformable when external force is applied thereto. For example, when a contact action is applied to the second substrate 15, a corresponding contact point is mechanically conveyed towards the first substrate 11 (see FIG. 6). In particular, the material of the second substrate 15 may be Poly Ethylene Terephthalate (PET), Poly Carbonate (PC), Poly Methyl Meth Acrylate (PMMA), Poly Imide (PI), or Poly Ethylene (PE). Moreover, the material of the first substrate 11 may be also selected from the above-mentioned group, particularly if the material of the first substrate 11 is the same as that of the second substrate 15.

Figure 2:
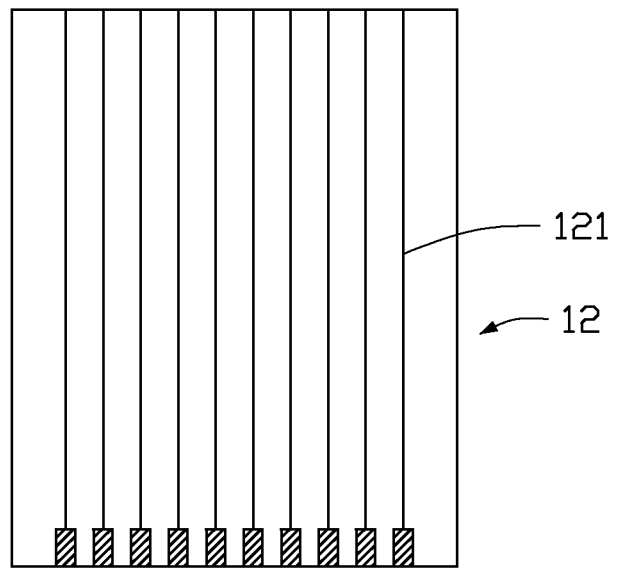
FIG. 2 is a planar view of the first conductive layer of the touch panel of FIG. 1.
Figure 3:
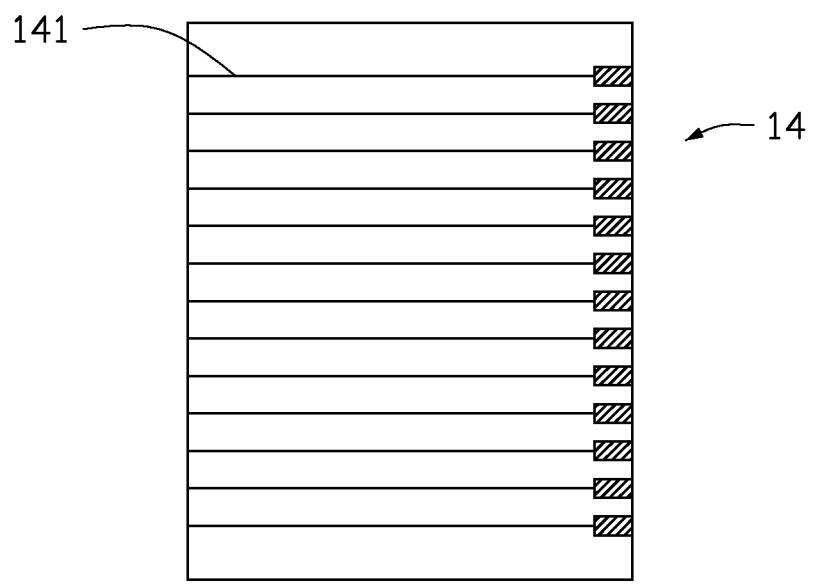
FIG. 3 is a planar view of the second conductive layer of the touch panel of FIG. 1.
Figure 4:
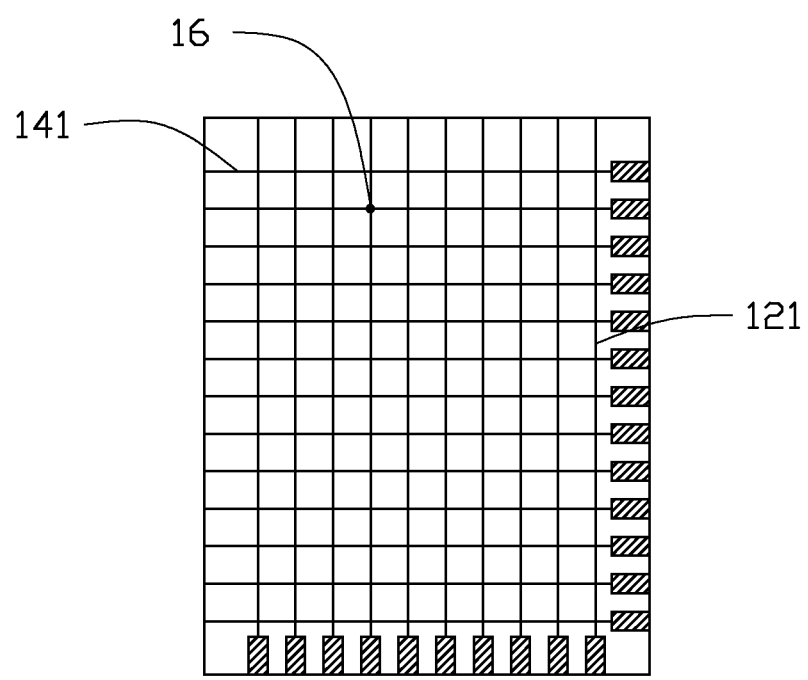
FIG. 4 illustrates a combination of the first and second conductive layers of the touch panel of FIG. 1.

Referring also to FIGS. 2-4, the first conductive layer 12 includes a plurality of first conductive lines 121 parallel to each other, and the second conductive layer 14 includes a plurality of second conductive lines 141 parallel to each other and perpendicular to the first conductive lines 121. In the illustrated embodiment, the first conductive lines 121 each extend along a first axis (such as a Y-axis) direction, and the second conductive lines 141 each extend along a second axis (such as an X-axis) direction.

With these configurations, a plurality of regions are formed by the overlapping between the first conductive lines 121 and the second conductive lines 141. Assuming that a pitch of the group of the first conductive lines 121 is W and a pitch of the group of second conductive lines 141 is also W, an area S of each region is about $W^2$, a fixed value. In one embodiment, the pitch W can be in the range from 0.5 mm (millimeters) to 10 mm.

In the illustrated embodiment, each of the regions can serve as a sensing unit. As the insulating layer 13 lies at each of the regions between the first conductive lines 121 and the second conductive lines 141, each sensing unit includes an overlapping capacitor 16 cooperatively formed by a corresponding first conductive line 121, a corresponding second conductive line 141, and the insulating layer 13 sandwiched therebetween.

Figure 6:
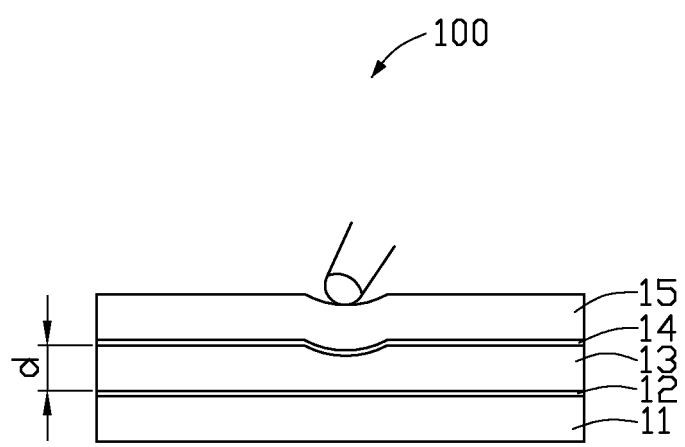
FIG. 6 is a side cross-sectional view of the touch panel of FIG. 1 when assembled, illustrating a response to a user's contact applied to the touch panel.

Referring to FIG. 1 and FIG. 6, a thickness of the insulating layer 13 is defined as d. Thus a capacitance C of each overlapping capacitor 16 can be calculated by the following formula:

$$C = \in S/(4\pi kd)$$

where $\in$ is a vertical dielectric parameter of the insulating layer 13, and k is a constant. As described, S has a fixed value, such that the capacitance C of the overlapping capacitor 16 is mainly determined by the thickness d and the dielectric parameter $\in$ of the insulating layer 13 positioned in the overlapping region. In one embodiment, the thickness d can be in the range from 0.1 mm to 10 mm.

In addition, the insulating layer 13 can be made of material compressible by external force, with such material being elastically recoverable when the external force is removed. Hence, upon contact of the touch panel 100, a concavity of the second substrate 15 created at the point of contact is effectively transferred to the insulating layer 13, thereby decreasing the thickness d of the insulating layer 13 at the point of contact (see FIG. 6). Moreover, in the present embodiment, the compressible material is further characterized by the dielectric parameter $\in$ thereof increasing with a reduction in the thickness d. Hence, when the contact action occurs, the dielectric parameter $\in$ of the insulating layer 13 at the point of contact changes according to the strength of the external force of the contact action.

Figure 5:
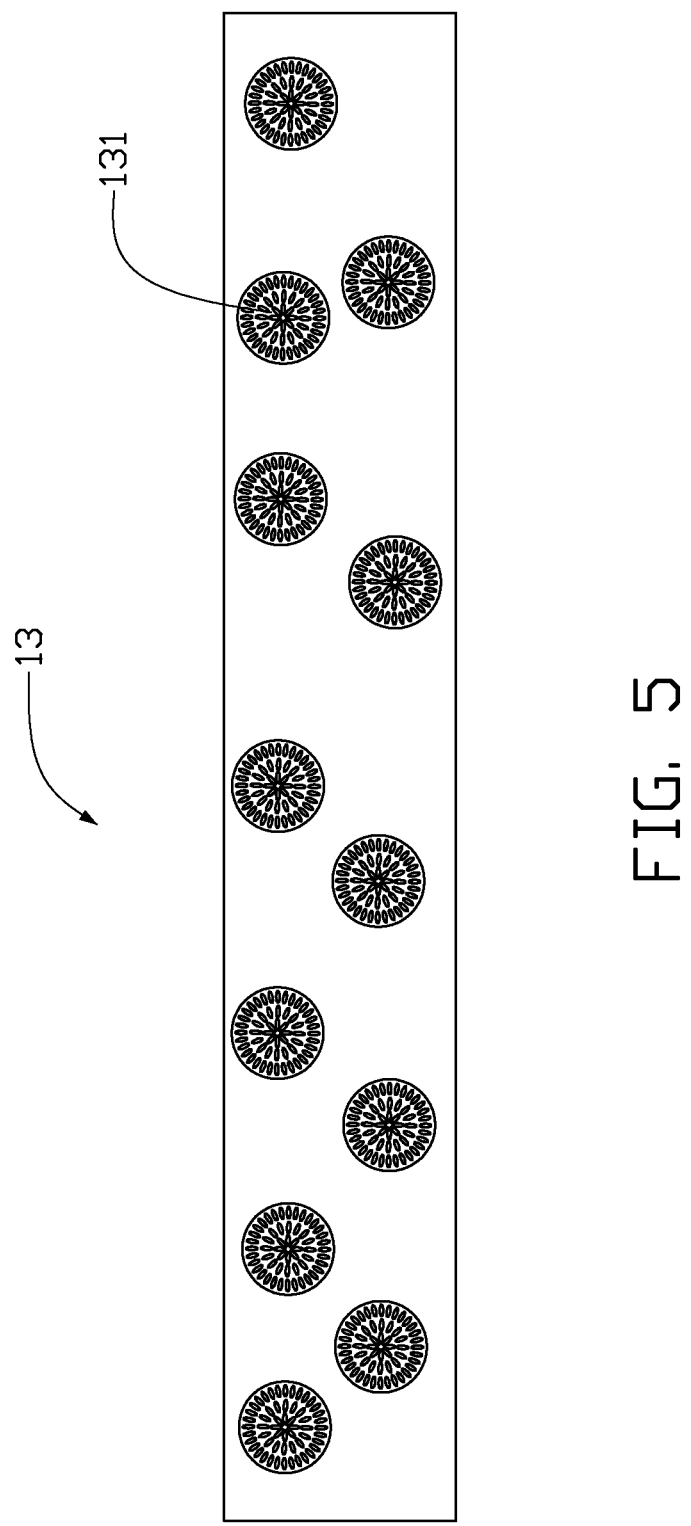
FIG. 5 is an enlarged, side cross-sectional view of the insulating layer of the touch panel of FIG. 1, the insulating layer including a plurality of liquid crystal drops dispersed in polymer material.

Referring also to FIG. 5, an exemplary structure of the insulating layer 13 is schematically illustrated. The insulating layer 13 can be, for example, a polymer dispersed liquid crystal (PDLC) film, which mainly includes liquid crystal material and polymer material. In particular, the polymer material may be capable of vertically aligning Twisted Nematic (TN) type liquid crystal molecules of the liquid crystal material.

In one embodiment, the PDLC film can be manufactured as follows. TN type liquid crystal material is provided and mixed with pre-polymer material, and the mixture polymerized. During the polymerization, the liquid crystal material and the pre-polymer material in the mixture are separated, and accordingly, after the polymerization, the liquid crystal material is converted into liquid crystal drops 131 dispersed in the polymer material. Moreover, by controlling manufacturing parameters of the polymerizing process, the liquid crystal drops 131 can be produced in substantially spherical form, at a substantially micron-level scale. In one embodiment, the diameter of the liquid crystal drops 131 can be in the range from 0.5 μm (micrometers) to 10 μm.

Each of the liquid crystal drops 131 includes a plurality of liquid crystal molecules. Due to the vertical alignment characteristic (or function) of the polymer material, in each of the spherical-shaped liquid crystal drops 131, the liquid crystal molecules are arranged so as to radiate outwards from a spherical center, as shown in FIG. 5.

Figure 7:
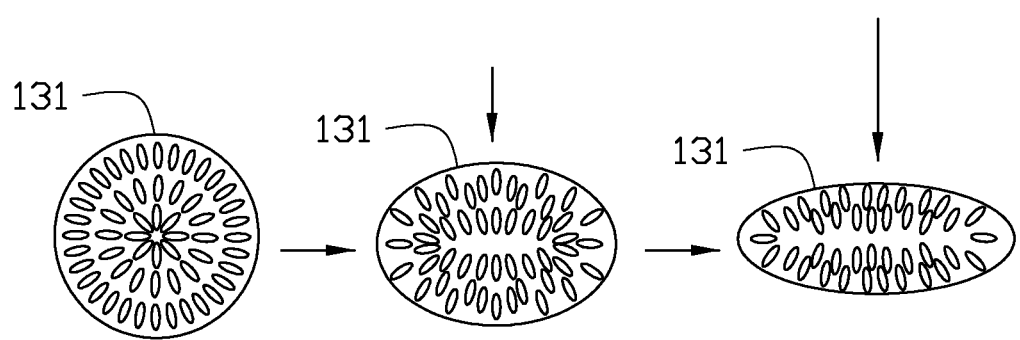
FIG. 7 schematically illustrates deformation of one of the liquid crystal drops of FIG. 5 in response to the user's contact applied to the touch panel.

When external force of a contact action is applied to the touch panel 100, as shown in FIG. 6, portions of the second substrate 15, the second conductive layer 14, and the insulating layer 13 corresponding to the contact point are impelled downward. Accordingly, a thickness of the portion of the insulating layer 13 is reduced, resulting in deformation of the liquid crystal drops 131 located thereabout. As shown in FIG. 7, the extent of deformation may be mainly determined by the magnitude of the external force. For example, the external force can deform corresponding liquid crystal drops 131 from spherical to ellipsoidal shapes. During the deformation, due to the vertical alignment characteristic of the polymer material, the liquid crystal molecules in each liquid crystal drop 131 tend to migrate radially outwardly from the center of the liquid crystal drop 131 toward a periphery of the liquid crystal drop 131, with the liquid crystal molecules generally becoming more parallel to one another throughout the liquid crystal drop 131. It is noted that, since the liquid crystal material is anisotropic, such realignment of the liquid crystal molecules alters the dielectric parameter $\in$ of the insulating layer 13 at the point of contact correspondingly.

For example, reformation of the liquid crystal drops 131 from spherical to ellipsoidal can increase the dielectric parameter $\in$ of the insulating layer 13 corresponding to the contact point. The increase is typically proportional to the extent of deformation; that is, the increase is typically proportional to a decrement of the thickness d of the insulating layer 13.

From the above-described formula $C=\in S/(4\pi k d)$, it can be seen that the increase of the dielectric parameter $\in$ of the insulating layer 13 and the decrease of the thickness d of the insulating layer 13 both increase the capacitance C of the corresponding overlapping capacitor 16. Further, as the increment of the dielectric parameter $\in$ is proportional to the decrement of the thickness d, the increment of the capacitance C of the overlapping capacitor 16 is also proportional to the decrement of the thickness d; that is, the increment of the capacitance C corresponds to the strength of the external force.

When the external force is applied to the touch panel 100, certain of the overlapping capacitors 16 proximate to the contact point undergo decrements of the thickness d of the insulating layer 13, and, in turn, the capacitances of these overlapping capacitors 16 increase. Therefore, identification of the overlapping capacitors 16 that have the highest capacitance increments provides identification of the first conductive line 121 and the second conductive line 141 nearest to the contact point. Accordingly, planar coordinates including an X-axis coordinate and a Y-axis coordinate of the contact point are obtained.

Additionally, the capacitance increment or even the actual capacitance of a given overlapping capacitor 16 can be measured, and thereby a decrement of the thickness of the insulating layer 13 corresponding to the contact point can be calculated. Thus, a Z-axis coordinate of the contact point can be obtained.

As can be seen, in the touch panel 100 according to embodiments of the present disclosure, by adopting the insulating layer 13 with the dielectric parameter $\in$ that varies according to a decrease in the thickness of the insulating layer 13, three-dimensional contact point detection is enabled. Accordingly, a three-dimensional touch-enabled display device employing the touch panel 100 can be provided. Details are as follows.

Figure 8:
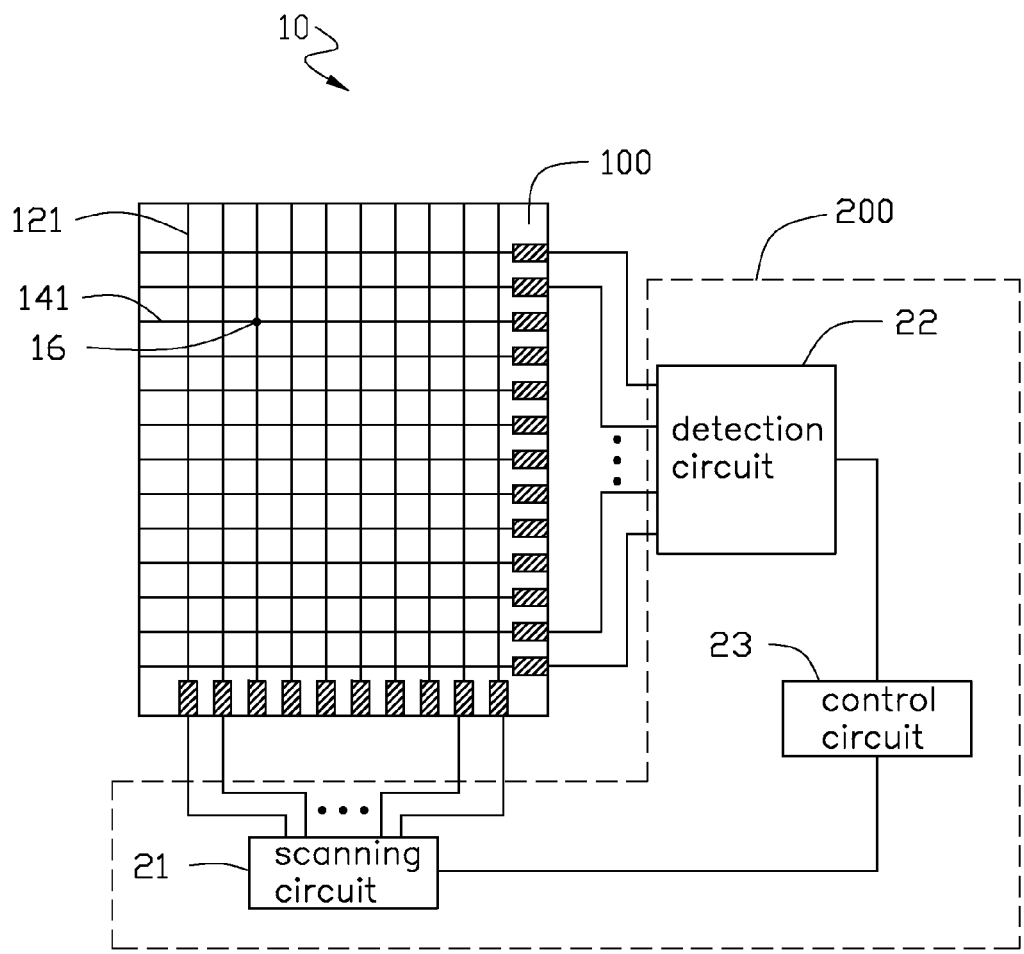
FIG. 8 is a block diagram of an exemplary embodiment of a touch-sensitive display device according to the present disclosure.

FIG. 8 is a block diagram of an exemplary embodiment of a touch-sensitive display device 10 according to the present disclosure. The touch-sensitive display device 10 includes the touch panel 100 as disclosed, and a driving circuit 200 for driving the touch panel 100. The driving circuit 200 is used for detecting capacitance variation of any one or more overlapping capacitors 16 nearest to a contact point corresponding to a contact action applied to the touch panel 100.

The touch panel 100 includes the plurality of parallel first conductive lines 121, and the plurality of parallel second conductive lines 141 perpendicular to the first conductive lines 121, with the plurality of overlapping capacitors 16 disposed at the intersections of the first and second conductive lines 121, 141. That is, each overlapping capacitor 16 is cooperatively formed by a corresponding first conductive line 121, a corresponding second conductive line 141, and the insulating layer 13 sandwiched therebetween.

The driving circuit 200 may include a scanning circuit 21, a detection circuit 22, and a control circuit 23. The scanning circuit 21 is electrically coupled to the first conductive lines 121, and is configured to provide scanning signals to the first conductive lines 121 successively. The detection circuit 22 is electrically coupled to the second conductive lines 141, and is configured to detect signals transmitted in the second conductive lines 141 and correspondingly calculate 3D coordinates of the contact point corresponding to the contact action. The control circuit 23 is electrically coupled to both the scanning circuit 21 and the detection circuit 22. The control circuit 23 can control scanning timing of the scanning circuit 21, and can also generate a control signal based on the 3D coordinates provided by the detection circuit 22.

In one embodiment, the touch-sensitive display device 10 may also include a display panel (not shown) electrically coupled to the control circuit 23. The display panel can be a liquid crystal panel or another kind of flat panel. The display panel receives the control signal output by the control circuit 23, and displays an image according to the control signal.

In operation of the touch-sensitive display device 10, the control circuit 23 provides timing signals to both the scanning circuit 21 and the detection circuit 22. The scanning circuit 21 then generates a plurality of scanning signals, which are output to the first conductive lines 121 in succession. When no contact action is applied to the touch panel 100, each overlapping capacitor 16 has an original capacitance. While being scanned, each overlapping capacitor 16 located corresponding to the scanned first conductive line 121 generates a voltage signal, and outputs the voltage signal to the detection circuit 22 via the corresponding second conductive line 141.

Upon contact of the touch panel 100 by a user, a portion of the insulating layer 13, which corresponds to the contact point, is impelled downward by the external force of the contact action. The thickness d of this portion of the insulating layer 13 decreases, and the dielectric parameter $\in$ of the portion of the insulating layer 13 increases. This increases the capacitances of the overlapping capacitors 16 located at the contact point. Responsive to the variations in capacitances, the voltage signals provided by these overlapping capacitors 16 vary to extents corresponding to the capacitance increments of the overlapping capacitors 16.

The detection circuit 22 detects the amounts of variation of the voltage signals corresponding to each involved overlapping capacitor 16, and calculates the capacitance increments of all these overlapping capacitors 16 according to the amounts of variation. The detection circuit 22 identifies and selects the overlapping capacitor 16 with the greatest capacitance increment, and performs a coordinate analysis on the sensing unit corresponding thereto. Thereby, the detection circuit 22 obtains an X-axis coordinate and a Y-axis coordinate of the contact point.

Moreover, the detection circuit 22 can utilize a preset relationship between the capacitance increment of the selected overlapping capacitor 16 and the thickness of the insulating layer 13, thereby obtaining a thickness decrement of the insulating layer 13 at the contact point. Based on the thickness decrement, a Z-axis coordinate of the contact point can be calculated by the detection circuit 22. As such, the detection circuit 22 obtains 3D coordinates (X, Y, Z) of the contact point.

The detection circuit 22 then outputs the 3D coordinates (X, Y, Z) to the control circuit 23, which then transmits a corresponding control signal to the display panel. The display panel then shows a corresponding display. Further or alternatively, the control signal may initiate another operation of the touch-sensitive display device 10 according to the 3D coordinates (X, Y, Z) of the contact point of the user.

It is to be further understood that even though numerous characteristics and advantages of preferred and exemplary embodiments have been set out in the foregoing description, together with details of the structures and functions of the embodiments, the disclosure is illustrative only; and that changes may be made in detail, especially in matters of shape, size and arrangement of parts within the principles of the invention to the full extent indicated by the broad general meaning of the terms in which the appended claims are expressed.

What is claimed is:

1. A touch panel connecting to a driving circuit, comprising:
   a first conductive layer;
   a second conductive layer; and
   an insulating layer between the first and second conductive layers;
   wherein the insulating layer comprises a polymer dispersed liquid crystal (PDLC) film and a relative permittivity of the PDLC film increases when a thickness of the PDLC film is reduced, wherein a plurality of overlapping capacitors are cooperatively defined by the first and second conductive layers and the insulating layer therebetween; and
   wherein the driving circuit detects an X-axis coordinate and a Y-axis coordinate of a contact point on the touch panel by detecting one or more capacitance variations of one or more of the overlapping capacitors that correspond to the contact point, and detects a Z-axis coordinate of the contact point by calculating one or more capacitance increments of said one or more of the overlapping capacitors;
   wherein the PDLC film comprises a plurality of liquid crystal drops dispersed in the polymer material, and the polymer material is characterized in that it operates to vertically align liquid crystal molecules of the liquid crystal drops;
   wherein a shape of each of the liquid crystal drops is substantially spherical when no external force is applied to the PDLC film, and when external force is applied to the PDLC film, at least one of the liquid crystal drops reforms from substantially spherical to a generally ellipsoidal shape; and
   wherein when the external force is applied to the PDLC film, the liquid crystal molecules in each of said at least one of the liquid crystal drops realign from radiating outwards from a spherical center to a more parallel distribution relative to each other.

2. The touch panel of claim 1, wherein the first conductive layer comprises a plurality of first conductive lines, the second conductive layer comprises a plurality of second conductive lines crossing the first conductive lines, and the plurality of overlapping capacitors are formed at the intersections between the first and second conductive lines, wherein a capacitance of each of the overlapping capacitors is variable.

3. The touch panel of claim 1, wherein an arrangement of the liquid crystal molecules of each of the liquid crystal drops is variable in response to external force applied to the PDLC film.

4. The touch panel of claim 1, wherein when no external force is applied to the PDLC film, the liquid crystal molecules of each of the liquid crystal drops are arranged radiating outwards from the spherical center of the liquid crystal drop.

5. A touch-sensitive display device, comprising:
   a touch panel comprising a first conductive layer, a second conductive layer, and an insulating layer therebetween;
   wherein the insulating layer comprises a polymer dispersed liquid crystal (PDLC) film and a relative permittivity of the PDLC film increases when a thickness of the PDLC film is reduced, wherein a plurality of overlapping capacitors are cooperatively defined by the first and second conductive layers and the insulating layer therebetween; and a driving circuit configured for detecting an X-axis coordinate and a Y-axis coordinate of a contact point on the touch panel by detecting one or more capacitance variations of one or more of the overlapping capacitors that correspond to the contact point, and detecting a Z-axis coordinate of the contact point by calculating one or more capacitance increments of said one or more of the overlapping capacitors;

wherein the PDLC film comprises a plurality of liquid crystal drops dispersed in the polymer material, and the polymer material is characterized in that it operates to vertically align liquid crystal molecules of the liquid crystal drops;

wherein a shape of each of the liquid crystal drops is substantially spherical when no external force is applied to the PDLC film, and when external force is applied to the PDLC film at the contact point, at least one of the liquid crystal drops reforms from substantially spherical to a generally ellipsoidal shape; and wherein when the external force is applied to the PDLC film at the contact point, the liquid crystal molecules in each of said at least one of the liquid crystal drops realign from radiating outwards from a spherical center to a more parallel distribution relative to each other.

6. The touch-sensitive display device of claim 5, wherein the first conductive layer comprises a plurality of first conductive lines, the second conductive layer comprises a plurality of second conductive lines crossing the first conductive lines, and the overlapping capacitors are formed at the intersections between the first and second conductive lines.

7. The touch-sensitive display device of claim 6, wherein the driving circuit detects an X-axis coordinate and a Y-axis coordinate of the contact point by determining an overlapping capacitor of said one or more of the overlapping capacitors having the greatest capacitance variation.

8. The touch-sensitive display device of claim 7, wherein the driving circuit detects a Z-axis coordinate of the contact point by calculating the capacitance increment of the overlapping capacitor having the greatest capacitance variation.

9. The touch-sensitive display device of claim 5, wherein an arrangement of the liquid crystal molecules of at least one of the liquid crystal drops of said one or more of the overlapping capacitors is variable in response to external force applied to the PDLC film at the contact point.

10. The touch-sensitive display device of claim 5, wherein when no external force is applied to the PDLC film, the liquid crystal molecules of each of the liquid crystal drops radiate outwards from the spherical center of the liquid crystal drop.

* * * * *